US007110980B2

(12) United States Patent
Almonte et al.

(10) Patent No.: US 7,110,980 B2
(45) Date of Patent: Sep. 19, 2006

(54) SYSTEM AND METHOD FOR FACILITATING ELECTRONIC TRANSFER OF FUNDS

(75) Inventors: Eddy Almonte, Brooklyn, NY (US); Steven Aponte, Staten Island, NY (US); Gennaro Bruni, East Hampton, NY (US); Luiz C. Couto, Miami, FL (US); Gabriela Crespo, North Bergen, NJ (US); Nageswararao Dasari, Sewaren, NJ (US); Nina Eckstein, Tinton Falls, NY (US); Joseph Fernandez, River Vale, NJ (US); Bill Gilbert, L. Niguel, CA (US); Gordon Joost, Shelter Island, NY (US); George Kreiner, Chestnut Ridge, NY (US); Subramaniam Krishnan, Westfield, NJ (US); Ramaswamy Madhavan, Rego Park, NY (US); Arthur McGrath, Brooklyn, NY (US); Colleen Wolfe, Summit, NJ (US)

(73) Assignee: American Express Bank Ltd., New York, NY (US)

( * ) Notice: Subject to any disclaimer, the term of this patent is extended or adjusted under 35 U.S.C. 154(b) by 91 days.

(21) Appl. No.: 10/358,801

(22) Filed: Feb. 5, 2003

(65) Prior Publication Data
US 2003/0236726 A1 Dec. 25, 2003

Related U.S. Application Data

(60) Provisional application No. 60/390,523, filed on Jun. 21, 2002.

(51) Int. Cl.
*G06F 17/60* (2006.01)

(52) U.S. Cl. .......................................... 705/39; 705/40

(58) Field of Classification Search ............. 705/39–43
See application file for complete search history.

(56) References Cited

U.S. PATENT DOCUMENTS 5,424,938 A * 6/1995 Wagner ...................... 364/408
5,691,524 A 11/1997 Josephson
5,802,499 A 9/1998 Sampson et al.

(Continued)

FOREIGN PATENT DOCUMENTS

GB 2369711 A * 5/2002

(Continued)

OTHER PUBLICATIONS

LOGICA: "Logica is First to Be Certified With Federal Reserve Bank's New Fedwire Funds Transfer Format", Business Wire, Business/Technology Editors, Sep. 29, 1997.*

*Primary Examiner*—Hani M. Kazimi
(74) *Attorney, Agent, or Firm*—Snell & Wilmer L.L.P.

(57) ABSTRACT

A system for facilitating electronic transfer of funds includes a transfer administrator in communication with a transferor institution, one or more intermediary institution, and a transferee institution, the transferor institution having an account at the one or more intermediary institution. The transfer administrator may be configured to receive an incoming payment request designating said transferor institution, a quantity of funds to be transferred, and the transferee institution. The transfer administrator generates and issues a translated payment order based at least in part on the incoming payment request and configured to accomplish a transfer among the transferor institution, the one or more intermediary institution, and the transferee institution. Finally, the transfer administrator may facilitate processing of a balancing payment among the transferor institution, the one or more intermediary institution, and the transferee institution.

20 Claims, 3 Drawing Sheets

U.S. PATENT DOCUMENTS

| | | |
|---|---|---|
| 5,848,400 A | 12/1998 | Chang |
| 5,890,140 A | 3/1999 | Clark et al. |
| 5,905,976 A | 5/1999 | Mjolsnes et al. |
| 5,974,146 A | 10/1999 | Randle et al. |
| 6,076,074 A | 6/2000 | Cotton et al. |
| 6,226,623 B1 | 5/2001 | Schein et al. |
| 6,609,113 B1 * | 8/2003 | O'Leary ............ 205/39 |
| 2001/0018674 A1 | 8/2001 | Schein et al. |
| 2001/0034682 A1 | 10/2001 | Knight et al. |
| 2002/0023053 A1 | 2/2002 | Szoe et al. |
| 2002/0052841 A1 | 5/2002 | Guthrie et al. |
| 2002/0055907 A1 | 5/2002 | Pater et al. |
| 2002/0065784 A1 | 5/2002 | Ranzini et al. |
| 2002/0111916 A1 * | 8/2002 | Coronna et al. ............ 705/64 |

FOREIGN PATENT DOCUMENTS

JP    02000040116 A  *  2/2000

* cited by examiner

SYSTEM AND METHOD FOR FACILITATING ELECTRONIC TRANSFER OF FUNDS

CROSS REFERENCE TO RELATED APPLICATION

This application claims benefit of priority from U.S. Provisional Patent Application Ser. No. 60/390,523 filed Jun. 21, 2002, which is hereby incorporated by reference.

FIELD OF INVENTION

The present invention relates generally to systems for facilitating electronic transfer of funds, and more specifically to systems for facilitating electronic transfer of funds among remotely located parties that lack both an account relationship with a common institution and an infrastructure suitable to enable use of a common electronic funds transfer protocol.

BACKGROUND OF INVENTION

In today's world, electronic funds transfers have become increasingly common. Where a single financial institution has an account relationship with both a transferor, i.e., provider, and a transferee, i.e., recipient, of transferred funds, completing an electronic transfer of funds is a relatively simple task. This is because the single financial institution involved has sufficient authority to accomplish all the steps necessary to complete the transfer, e.g., both the authority to debit an account of the transferor and the authority to credit an account of the transferee.

Yet, in many situations, no single financial institution exists that has these necessary account relationships with both the transferor and the transferee. The more common case is that the transferor's financial institution is distinct from the transferee's financial institution, creating a need for the establishment of a relationship between these institutions. For example, a transferor may have an account relationship with a first institution while a transferee has an account relationship with a second institution. The first institution, however, may not have any established relationship with the second institution.

To address this need, it has become common for financial institutions to employ one or more intermediary, i.e., correspondent, institutions. In such cases, the intermediary institution provides a mechanism through which a transferor's institution and a transferee's institution may reliably ensure the debiting of an account of the transferor, the crediting of an account of the transferee, and appropriate balancing transactions between the institutions, i.e., the completion of the electronic funds transfer. Thus the intermediary institution effectively bridges the gap between the institutions that have the relationships with the transferor and the transferee.

Within the United States, most independent financial institutions maintain an account relationship with one of the Federal Reserve Banks, and are thus referred to as Federal Reserve member institutions. Through the Federal Reserve Bank system, Federal Reserve Banks are able to serve as intermediary institutions, thus providing the bridging function among Federal Reserve member institutions. Accordingly, where a transferor has an account relationship with a first institution that also has an account relationship with one of the Federal Reserve Banks, the first institution may cooperate with the Federal Reserve Bank to accomplish a transfer of funds to any other institution that also has a relationship with any of the Federal Reserve Banks. Thus, the transferor may electronically transfer funds to any transferee so long as that transferee also has an account relationship with a Federal Reserve member institution.

To facilitate automated processing of such transactions, the Federal Reserve Banks have established a communication protocol known as the Fedwire Funds Transfer Protocol. This protocol is described in the Fedwire Funds Transfer Reference Card, published by Federal Reserve Financial Services effective Jul. 15, 2002 and is hereby incorporated by reference for background purposes. In addition, most member institutions have developed infrastructures within their institutions to automate and simplify the processing of Fedwire transactions. For example, member institutions may integrate their internal accounting systems with the Fedwire messaging, wiring, and settlement instructions to eliminate manual ledger entering, e.g., debiting and crediting, and translating of messages.

Unfortunately, not all institutions are able to, or choose to, use one of the Federal Reserve Banks as an intermediary. For example, financial institutions located entirely outside the United States rarely enjoy status as members of the Federal Reserve system. Similarly, a small but significant minority of institutions within the United States maintain no account affiliation with any of the Federal Reserve Banks. As a result, such institutions may not possess an established infrastructure or may not otherwise be equipped to efficiently use the Fedwire Funds Transfer Protocol.

Another drawback of the Federal Reserve system is that it does not facilitate provision of meaningful customer service when transferring funds from a member institution to a non-member institution. Fedwire does not provide any mechanism for tracking and reporting on the status of transactions once they have cleared the Fedwire system. For example, where a transferor institution desires to transfer funds through Fedwire to another U.S. institution, e.g., so that the second U.S. institution may be able to accommodate a further transfer to a foreign institution, the use of Fedwire will effectively insulate the transferor institution from the foreign institution. Put another way, when a transferor institution relies on Fedwire, no standardized or automated mechanism exists for the transferor institution to acquire information regarding the status of the terminal portion of the transfer (the portion of the transfer from the second U.S. institution to the foreign institution). In such cases, transferors who may have no relationship with the ultimate transferee institution may not have access to any convenient mechanism for investigating where or why a transfer failed. This difficulty can be significant where the transferee institution is located in a foreign country.

In many cases, financial institutions that cooperate to accomplish electronic funds transfers charge fees for their services. In some cases, it may be desirable that such fees be waived, refunded, or credited, either wholly or partially, or that other rewards be offered based on a cooperating institution's compliance with a prescribed set of criteria, such as transaction volume, transaction frequency, membership, affiliation, use of a desired protocol, and the like. As financial institutions increase the extent to which they engage in electronic funds transfers, it becomes increasingly important to distinguish those electronic funds transfers that may participate in such incentive offerings from those that are exempt from participating in such incentive offerings. As used herein, the phrase "participating transfer order" refers to an electronic funds transfer order that enables one or more of the associated institutions to substantially participate in incentive offerings due to compliance with prescribed criteria such as those mentioned above. Where use of a specific protocol or messaging system enables an institution to substantially participate in incentive offerings, that system or protocol is described as a "participating electronic funds transfer protocol." Accordingly, as used herein, the phrase "participating transfer" refers to an electronic funds transfer that substantially qualifies for incentives due to its compliance with prescribed criteria such as those mentioned above.

Contrariwise, where use of a specific protocol or messaging system causes the sending institution to be substantially excluded from incentive offerings, that system or protocol is described as an "exempt electronic funds transfer protocol." Accordingly, as also used herein, the phrase "exempt payment request" refers to an electronic funds transfer request that causes the transferor, i.e., sending, institution to be substantially excluded from incentive offerings due to its use of an exempt electronic funds transfer protocol. Similarly, as used herein, the phrase "exempt transfer" refers to an electronic funds transfer that substantially precludes incentives due to its use of an exempt electronic funds transfer protocol.

It should be noted that individual countries, or groups of countries, may have an established infrastructure, and/or a standardized mechanism, for accomplishing electronic funds transfers among financial institutions. For example, in the United States, financial institutions predominantly rely upon the Fedwire Funds Transfer Protocol discussed above to accomplish money transfers among financial institutions where both the transferor institution and the transferee institution are Federal Reserve member institutions. Use of the Fedwire Funds Transfer Protocol generally precludes participation in incentive offerings (i.e., Fedwire is an exempt electronic funds transfer protocol). Use of the Fedwire Funds Transfer Protocol does, however, provide for settlement of the transaction. Consequently, when the Fedwire system is used, messaging and settlement occur simultaneously with the sending of the Fedwire message, and no intermediary institution, other than the Federal Reserve Banks, is involved.

Figure 1:
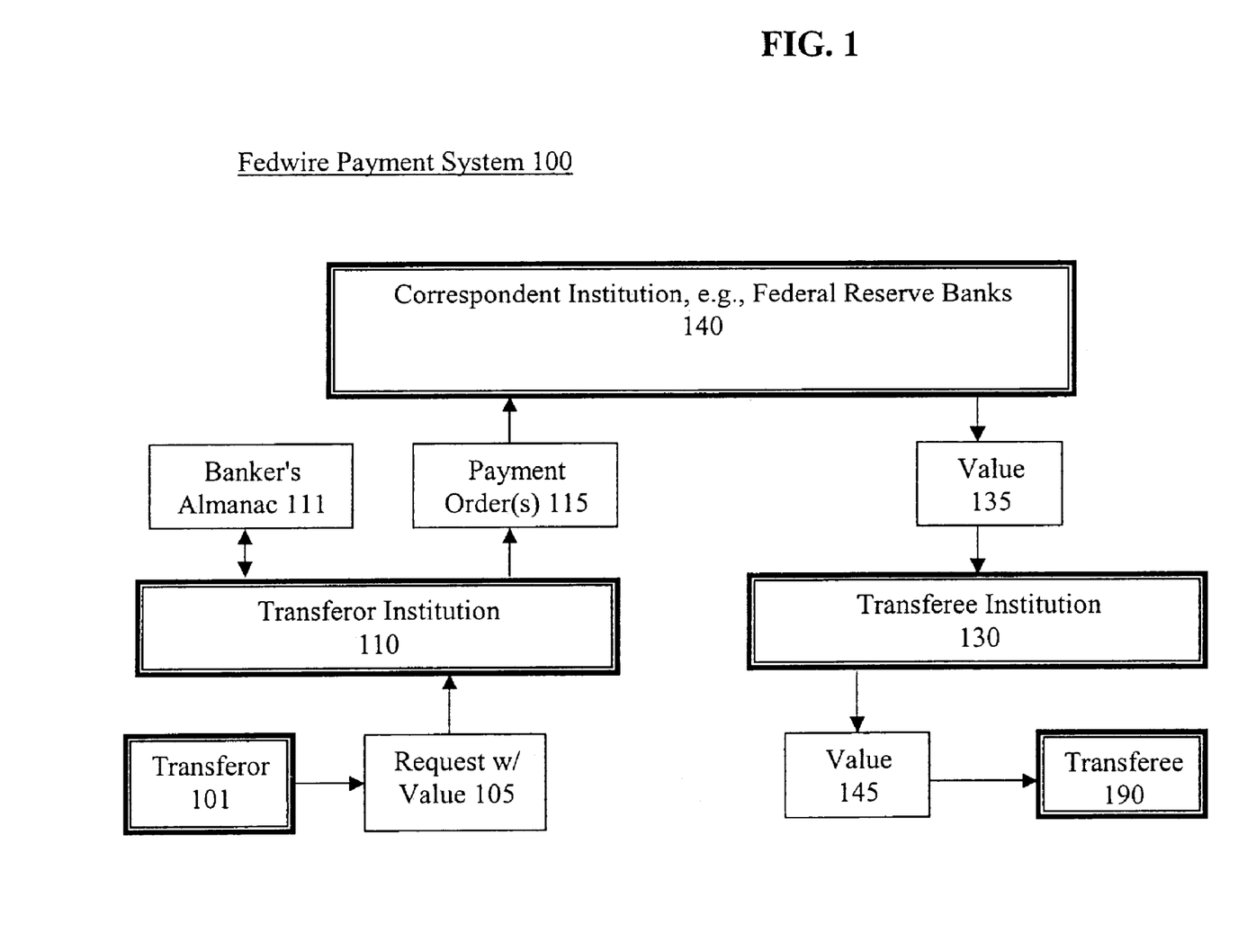
FIG. 1 illustrates a conventional electronic funds transfer accomplished using the Fedwire payment system.

As shown in FIG. 1, transfers accomplished using the Fedwire payment system 100 typically involve a transferor institution 110 and a transferee institution 130. Transfers accomplished using the Fedwire payment system 100 may also involve one or more of the Federal Reserve Banks acting as an intermediary institution 140. Typically, a transferor 101 communicates a request with corresponding value 105 to a transferor institution 110. It should be noted that the value may be delivered by the transferor 101 to the transferor institution 110 as cash, commercial paper, or sufficient information to identify an account from which sufficient funds may be drawn. In addition to delivering funds, or identifying the source of funds, to be transferred, the transfer request 105 typically identifies a transferee institution 130, a quantity of funds to be transferred, a transferee 190, and may also identify a specific transferee's account 190 at the transferee institution 130.

In response to the transfer request 105, the transferor institution 110 may retrieve information from a database 111, such as a banker's almanac or other similar database, to identify and select an intermediary institution 140 that has an account relationship with the transferee institution 130. Using this information, the transferor institution 110 may initiate the transfer through the appropriate intermediary institution 140 using whatever protocol the intermediary institution 140 requires, e.g., the Fedwire protocol, by communicating one or more payment order 115 to the intermediary institution 140.

Based on the payment order 115, the intermediary institution 140 provides value 135 to the transferee institution 130, and the transferee institution 130 provides a corresponding amount of value 145 to the transferee 190. It should be noted that value may be provided by delivering cash, issuing commercial paper, crediting an account of a recipient, or other means known in the art.

As discussed herein, there are a variety of transfer systems and associated communication protocols currently in use throughout the world, e.g., Fedwire, SWIFT, CHIPS, ACH. In general, these transfer systems and/or protocols allow financial institutions to transfer funds on their own behalf or on behalf of their customers. Such transfers may result from, for example, trades of federal funds and other interbank transactions, purchases, sales of securities, or time-sensitive payments. Although the Fedwire system accommodates transfers by telephone and other conventional forms of communication, most transactions are accomplished through on-line communications using computer systems. For more information on the Federal Reserve system, see The Federal Reserve System—Purposes and Function, Eighth Edition, December 1994 (Library of Congress 39-26719), which is hereby incorporated by reference for background purposes.

While domestic electronic funds transfer systems and protocols such as Fedwire are used extensively to accomplish electronic funds transfers within their associated networks of affiliated institutions, e.g., members of the Federal Reserve system, they do not adequately accommodate transfers of money among financial institutions where the transferor financial institution and the transferee financial institution are not affiliated with such a network of institutions, particularly in the case of international funds transfers. In addition, many domestic electronic funds transfer systems do not typically provide any rewards, rebates, refunds, credits or other types of incentives for their use. Thus, financial institutions using domestic transfer systems such as Fedwire are typically limited to conducting only domestic, exempt electronic funds transfers.

As used herein, the term "domestic electronic funds transfer" refers to an electronic funds transfer where both the transferor and the transferee and/or their respective financial accounts and/or financial institutions are situated within a single nation (e.g., the United States). Similarly, as used herein, the terms "domestic electronic funds transfer protocol" and "domestic electronic funds transfer system" refer to systems and protocols for accomplishing domestic electronic funds transfers (e.g., Fedwire and its counterparts operated within the United States).

To facilitate transfers of money among financial institutions where it is impossible or undesirable to accomplish transactions using only a single domestic and/or exempt system such as Fedwire (e.g., where the transferor institution and the transferee institution are located in different nations and/or where the transferee institution otherwise discourages or precludes use of Fedwire or any other domestic or exempt protocol), various international and/or participating electronic funds transfer systems have been developed. For example, the Society of Worldwide International Financial Telecommunications has developed a secure communication system utilized among institutions, known as the SWIFT messaging system (protocol). Many foreign financial institutions utilize the SWIFT protocol because it facilitates, and is widely accepted for conducting, international transfers. In addition, many institutions also desire to use the SWIFT protocol to gain access to incentives not available in conjunction with Fedwire (i.e., SWIFT is a participating electronic funds transfer protocol).

It should be noted, however, that unlike Fedwire, many funds transfer systems and/or protocols may not necessarily provide for settlement, i.e. may not include payment to balance the funds transfer. For example, SWIFT is a purely messaging protocol and does not currently provide settlement capability. Accordingly, when a transferor institution sends a SWIFT message to an intermediary institution or directly to a transferee institution, the transferor must also provide a means for balancing the transfer, i.e., must provide some form of value to the transferee institution. As used herein, electronic funds transfer protocols that provide for settlement are referred to as "settling protocols," and electronic funds transfer protocols that do not provide for settlement are referred to as "non-settling protocols."

As briefly mentioned above, in addition to facilitating international transfers, use of the SWIFT protocol may enable financial institutions to access various incentives. For example, in accordance with a rebate process known as a benededuct, intermediary institutions using the SWIFT protocol may rebate a portion of the fees charged to the other institutions if, for example, a pre-determined transaction volume through the intermediary institution is reached. While it should be noted that a wide variety of incentive mechanisms are possible, an exemplary scheme shifts part or all of the liability for the fees associated with a particular transfer from the transferor institution to the transferee institution. In accordance with this scheme, fees charged by the transferor institution may be collected by the intermediary institution via automatic deduction from the proceeds to be paid to the transferee. Other schemes may enable the transferor and/or transferee institutions to share in the fees collected by the intermediary institution. Thus, financial institutions using such incentive providing transfer systems are participating institutions, and the transfers they conduct are participating transfers. It should be noted once again, however, that the Fedwire system does not accommodate such sharing of fees among the participating institutions, and is, thus, an exempt funds transfer system.

Typically, financial institutions adopt a single electronic finds transfer protocol and develop their infrastructures to support use of that protocol, e.g., Fedwire. Despite the advantages offered by the SWIFT system and other participating systems, the vast majority of financial institutions in the United States have adopted and established infrastructures based on the Fedwire protocol and have elected to not automate their use of the SWIFT communications system or any other incentive-offering system. Thus, these institutions typically may automatically transmit only exempt electronic funds transfer orders. Moreover, often as a result of insufficiently trained staff or under-developed infrastructures, many of those institutions that could otherwise manually issue participating transfers, nevertheless, fail to comply with formalities, e.g., they fail to properly prepare SWIFT-formatted payment orders, causing those transfers to also be non-participating, i.e., exempt, transfers.

To effect an international transaction in the most advantageous manner, it is typically necessary or desirable to use an intermediary institution that is both situated in the country of the transferor institution and equipped with an international network. Most major international institutions, and domestic intermediary institutions with full international networks and capabilities, however, have payments/communications software and hardware that are based on, and therefore require use of, a participating protocol, e.g., the SWIFT protocol. Thus, these institutions are not equipped to accommodate common exempt or domestic transfer protocols such as Fedwire. For this reason, it is currently difficult and inefficient for financial institutions in the United States who may have adopted and established infrastructures based on an exempt domestic protocol such as Fedwire to use a participating (e.g., SWIFT-based) intermediary institution to accomplish international transfers. As a result, with respect to international payments or transactions with an international connection (i.e., the transferee is outside the country of the transferor), exempt institutions typically cannot adequately access the processing capabilities, favorable cost/pricing, reconciliation services, inquiry services, and/or other advantages typically enjoyed by other intermediary institutions, placing exempt institutions at a disadvantage relative to participating institutions.

Accordingly, it would be advantageous to have a system and method for facilitating electronic funds transfers that would permit a transferor's institution to use its preferred electronic funds transfer system and/or protocol while also accommodating use of an appropriate funds transfer protocol and/or system according to the preferences of an intermediary institution or a transferee's institution. It would further be advantageous to have a system and method that would enable financial institutions transmitting exempt funds transfers to continue to use their current exempt funds transfer infrastructures, e.g., Fedwire, while nevertheless enjoying the benefits of participating transfers. It would further be advantageous to have a system and method for facilitating electronic funds transfers that would accommodate an exempt payment request while accessing the benefits associated with participating payment orders by including the ability to automatically generate participating payment orders based at least in part on the exempt payment request. It would further be advantageous to have a system and method for facilitating electronic funds transfers that would accommodate use of non-settling protocols by providing a convenient means for settling such transfers.

SUMMARY OF THE INVENTION

The present invention is directed toward a system and method for facilitating electronic funds transfers. In particular, the invention is directed toward a system that enables a transferor's financial institution to transfer funds on behalf of the transferor through a financial institution of a transferee even though the institutions of the transferor and the transferee may bear no affiliation and even though the institutions of the transferor and the transferee may require use of differing electronic funds transfer systems and/or protocols. In an exemplary embodiment, the system of the invention comprises a transfer administrator configured to perform the steps of receiving an incoming payment request that designates a transferor institution, a quantity of funds to be transferred, and a transferee institution; generating a translated payment order based at least in part on the incoming payment request; and facilitating communication of the translated payment order to a transferee institution; whereby funds are electronically transferred from the transferor institution to the transferee institution.

In an exemplary embodiment, an incoming payment request may be transmitted in accordance with a funds transfer protocol preferred by a transferor institution. Accordingly, the incoming payment request may be in the form of an exempt (non-participating) payment request and may also be in accordance with a domestic funds transfer protocol, such as Fedwire. In accordance with this embodiment, an exemplary system may receive the incoming exempt payment request through one or more intermediary institution and may generate a translated payment order, which is based at least in part on the incoming payment request, but which may also be in accordance with a funds transfer protocol preferred by the designated transferee institution. Accordingly, the translated payment order may be a participating payment order and may be in accordance with a participating funds transfer protocol such as the SWIFT protocol/messaging system. The system, through an intermediary institution, facilitates communication of the participating payment order to the transferee institution, whereby funds are electronically transferred from the transferor institution to the transferee institution. Finally, the system may provide means for settling transfers among participating institutions where the transfers are conducted using a non-settling protocol.

In an exemplary embodiment, the method of the invention comprises receiving an incoming payment request in accordance with a first protocol, generating a translated payment order in accordance with a second protocol and based at least in part on the incoming payment request, and facilitating communication of the translated payment order to a transferee institution, whereby funds are electronically transferred from the transferor institution to the transferee institution. In accordance with an exemplary embodiment, the method may further comprise settling the transfer by facilitating processing of a balancing payment, or one or more accounting entry, among an account of transferor institution and an account of transferee institution.

As a result, where the transferor institution's preferred protocol may be exempt from, e.g., unable to fully or partially participate in, various benefits of a particular electronic funds transfer system and/or protocol, the system and method of the present invention may enable the transferor institution to nevertheless participate in those benefits. Moreover, it should be noted that, in accordance with the invention, it is not necessary that the transferor institution maintain any affiliation with the transferee institution, nor is it necessary that both the transferor institution and the transferee institution be Federal Reserve member banks, or be otherwise equipped to use the same electronic funds transfer protocol.

BRIEF DESCRIPTION OF EXEMPLARY DRAWINGS

The above-mentioned features and advantages of the present invention can be more clearly understood from the following detailed description considered in conjunction with the following drawings, in which like numerals represent like elements and in which.

DETAILED DESCRIPTION OF EXEMPLARY EMBODIMENTS

The detailed description of exemplary embodiments of the invention herein makes reference to the accompanying drawings, which show the exemplary embodiments by way of illustration. While these exemplary embodiments are described in sufficient detail to enable those skilled in the art to practice the invention, it should be understood that other embodiments may be realized and that logical and mechanical changes may be made without departing from the spirit and scope of the invention. Thus, this detailed description is presented for purposes of illustration only and not of limitation.

The present invention is directed toward a system and method for facilitating electronic funds transfers. In particular, the invention is directed toward a system that enables a transferor's financial institution to transfer funds on behalf of the transferor through a financial institution of a transferee even though the institutions of the transferor and the transferee may bear no direct affiliation with one another and even though the institutions of the transferor and the transferee may require use of differing electronic funds transfer systems and/or protocols. In an exemplary embodiment, the system of the invention comprises a transfer administrator configured to perform the steps of receiving an incoming payment request that designates a transferor institution, a quantity of funds to be transferred, and a transferee institution; generating a translated payment order based at least in part on the incoming payment request; and facilitating communication of the translated payment order to a transferee institution; whereby funds are electronically transferred from the transferor institution to the transferee institution.

In an exemplary embodiment, an incoming payment request may be transmitted in accordance with a funds transfer protocol preferred by a transferor institution. Accordingly, the incoming payment request may be in the form of an exempt (non-participating) payment request and may also be in accordance with a domestic funds transfer protocol, such as Fedwire. Further, the incoming payment request may provide for settlement. In accordance with this embodiment, an exemplary system may receive the incoming exempt payment request either directly from a transferor institution or through one or more intermediary institution and may generate a translated payment order that is based at least in part on the incoming payment request, but that may also be in accordance with a funds transfer protocol preferred by the designated transferee institution or that may enable an international electronic funds transfer. Accordingly, the translated payment order may be a participating payment order and may be in accordance with a participating funds transfer protocol such as the SWIFT protocol/messaging system.

In accordance with an exemplary embodiment, the system, either directly or through an intermediary institution, facilitates communication of the participating payment order to the transferee institution, whereby funds are electronically transferred from the transferor institution to the transferee institution. Accordingly, the present invention enables a financial institution that may be unable to fully or partially participate in various benefits associated with use of a particular electronic funds transfer system and/or protocol, and that may be unable to access an international network of institutions, to nevertheless participate in those benefits and to nevertheless access such an international network of institutions by generating a participating payment order based at least in part on an exempt (non-participating), domestic payment order submitted by the nonparticipating institution.

Accordingly, the present invention provides a system and method for facilitating electronic funds transfers that enables a transferor's financial institution to transfer funds on behalf of the transferor through a financial institution of a designated transferee even though the institutions of the transferor and the transferee may have no substantial affiliation and even though the institutions of the transferor and the transferee may require or prefer use of differing electronic funds transfer systems and/or protocols. Further, the present invention enables an otherwise exempt financial institution conducting otherwise exempt funds transfers to continue to use all or part of its established exempt funds transfer infrastructure while nevertheless enjoying the benefits of participating transfers typically enjoyed by participating institutions. The present system and method for facilitating electronic funds transfers accommodates an exempt payment request while nevertheless accessing the benefits associated with participating payment orders by including the ability to generate participating payment orders based at least in part on the exempt payment orders.

More particularly, the present invention is a process enhancement enabling an intermediary institution to process all or any portion of funds transfer payment orders originated by a financial institution via an exempt payment system, such as Fedwire, to be fully or partially converted into a participating payment order, such as a SWIFT payment order. To accomplish this process while accessing other benefits, the system of the present invention generates a participating payment order based, at least in part, on the exempt payment order. As a result, an intermediary institution that may offer a range of services based on its participating-system-compliant infrastructure (e.g., SWIFT-based payments processing hardware and software) may extend the availability to offer those services to institutions that may otherwise be limited to exempt transfers by virtue of their inability or refusal to comply with requirements for participating (e.g., sending SWIFT compliant payment orders) in incentive offerings. Similarly, transferor institutions that may not possess or otherwise be able to utilize a participating-system-compliant infrastructure may nevertheless avail themselves of those services.

In an exemplary embodiment, the system may be configured as a data processing system that includes a processor for processing digital data, a memory coupled to the processor for storing digital data, and means, coupled to the memory, for inputting digital data. In one embodiment, a transfer administrator may be configured as an application program, may be stored in the memory, and may be accessible by the processor for directing processing of digital data by the processor.

The system may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or data of any party that could be used in association with the present invention. As those skilled in the art will appreciate, user computer will typically include an operating system (e.g., Windows NT, 95/98/2000, Linux, Solaris, etc.) as well as various conventional support software and drivers typically associated with computers. User computer can be in a home or business environment with access to a network. In an exemplary embodiment, access may be had through the Internet through a commercially-available web-browser software package.

Communication among the parties to the transaction and the system of the present invention may be accomplished through any suitable communication means, such as, for example, a telephone network, intranet, Internet, point of interaction device (point of sale device, personal digital assistant, cellular phone, kiosk, etc.), online communications, offline communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The computing units may be connected with each other via a data communication network. The network may be a public network and assumed to be insecure and open to eavesdroppers. In the illustrated implementation, the network may be embodied as the Internet. In this context, the computers may or may not be connected to the Internet at all times. For instance, each institution's computer may employ a modem to occasionally connect to the Internet, whereas the institution computing center might maintain a permanent connection to the Internet. Specific information related to the protocols, standards, and application software utilized in connection with the Internet may not be discussed herein. For further information regarding such details, see, for example, DILIP NAIK, INTERNET STANDARDS ANDPROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

The systems may be suitably coupled to network via data links. A variety of conventional communications media and protocols may be used for data links. Such as, for example, a connection to an Internet Service Provider (ISP) over the local loop as is typically used in connection with standard modem communication, cable modem, Dish networks, ISDN, Digital Subscriber Line (DSL), or various wireless communication methods. Merchant system might also reside within a local area network (LAN) which interfaces to network via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference.

The computer may provide a suitable website or other Internet-based graphical user interface which is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Intervase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

Figure 2:
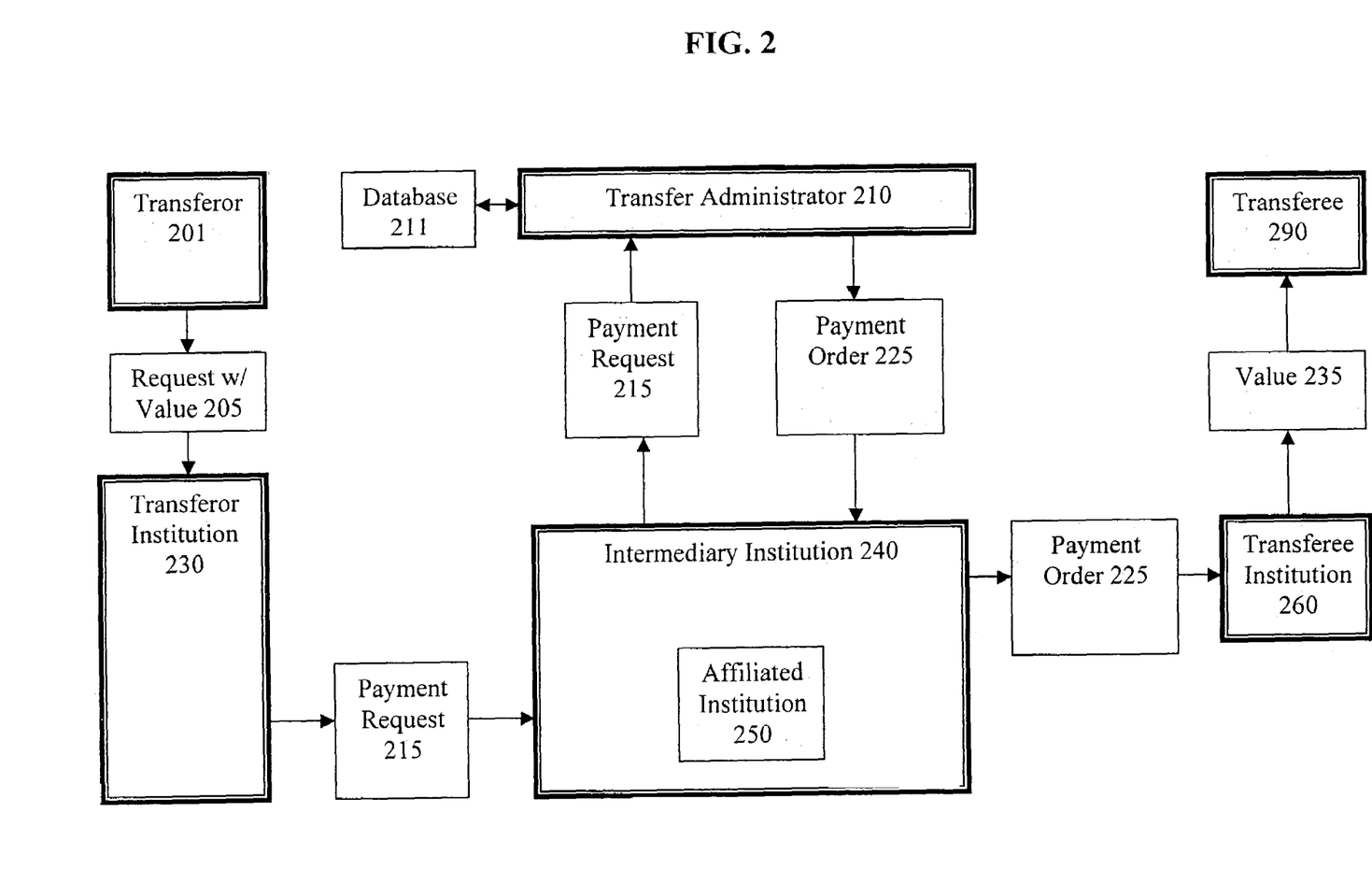
FIG. 2 illustrates a system for facilitating an electronic funds transfer in accordance with an exemplary embodiment of the present invention.

FIG. 2 illustrates an exemplary communication flow of a system for facilitating an electronic funds transfer in accordance with an exemplary embodiment of the present invention. With reference to FIG. 2, an exemplary system includes a transfer administrator 210, which is configured to received an incoming payment request 215 and to issue a corresponding translated payment order 225. In an exemplary embodiment, transferor 201 communicates a request 205, supported by appropriate value, to transferor institution 230. As shown in FIG. 2, transferor institution 230 responds to request 205 by communicating a corresponding payment request 215 through intermediary institution 240 to transfer administrator 210. It should be noted that in an alternative embodiment, transferor institution 230 may communicate payment request 215 directly to transfer administrator 210 in cases such as where transferor institution 230 has a sufficient account relationship with transferee institution 260. In response to payment request 215, transfer administrator 210, retrieves relationship information from database 211 and generates and issues translated payment order 225, which is communicated through intermediary institution 240 to transferee institution 260. It should be noted that in an alternative embodiment, transfer administrator 210 may communicate payment order 225 directly to transferee institution 260 in cases such as where transferor institution 230 has a sufficient account relationship with transferee institution 260. Finally, transferee institution 260 complies with payment order 225 by making value 235 available to transferee 290.

In accordance with an exemplary embodiment, transfer administrator 210 may be configured to receive payment request 215 directly from transferor institution 230, or alternatively, through intermediary institution 240. In addition, transfer administrator 210 may be configured to receive, accommodate, and comprehend payment request 215 in one or more accepted protocols such as an exempt funds transfer protocol, a domestic funds transfer protocol, an international funds transfer protocol or another protocol known in the art.

In an exemplary embodiment, transfer administrator 210 is in communication with transferor institution 230, either directly or through one or more intermediary institution 240 having an account relationship with transferor institution 230. In addition, transfer administrator 210 is configured to receive an incoming payment request 215 and to credit one or more transfer demand account on behalf of transferor institution 230 so as to balance the received funds, i.e., any credit applied to the account of the intermediary institution 240. Further, transfer administrator 210 may be configured to determine and allocate fees and/or rewards and to identify one or more appropriate intermediary institution 240, accounts, and/or transfer protocols, e.g., by accessing one or more databases 211 such as an ABA routing number database, a database of relationship information, and a database of intermediary institutions and their acceptable, desirable and/or required transfer protocols. It should be noted that such relationship information may include an algorithm for determining fees to be assessed in connection with the electronic transfer of funds.

In an exemplary embodiment, transfer administrator 210 is configured to generate a translated payment order that is configured in accordance with an electronic funds transfer protocol accepted, preferred, and/or required by transferee institution 260 and/or desired by transferor institution 230 and that is based at least in part on the incoming payment request 215. In addition, transfer administrator 210 is configured to facilitate issuance of the translated payment order to accomplish an electronic funds transfer among transferor institution 230 and transferee institution 260.

Where the translated payment order 225 does not intrinsically provide for settlement, i.e., the translated payment order 225 is non-settling, transfer administrator 210 may process one or more balancing payment, or one or more global accounting entries, among the accounts of transferor institution 230, transferee institution 260, and/or the one or more intermediary institutions 240 in accordance with the incoming payment request 215. Exemplary balancing payments may include debiting transfer demand account or another account that represents the proceeds from the incoming funds transfer request 215, e.g., the transferred payment, and facilitating the crediting of an account for the benefit of transferee institution 260, crediting an outgoing payment queue of the intermediary institution 240, and crediting an escrow account of transferor institution 230 in accordance with the acquired relationship information. For example, where the incoming payment request 215 is a Fedwire transfer order, it is understood that a corresponding credit will have been applied to the account of the intermediary institution 240 at its affiliated Federal Reserve institution. Accordingly, the intermediary institution 240 is required to apply a corresponding credit to an account maintained by the intermediary institution 240 to balance the credit applied at the Federal Reserve institution. Then, the intermediary institution 240 may credit an account maintained by it, or one or more of its affiliated institutions, on behalf of transferee institution 260 to fund the translated order it issues.

In an exemplary embodiment, incoming payment request 215 designates, for example, the identity of transferor institution 230, a quantity of funds to be transferred, and the identity of transferee institution 260. In addition, payment request 215 may designate a value date upon which to perform the transfer. Further, payment request 215 may be configured in accordance with an electronic funds transfer protocol preferred by transferor institution 230. Accordingly, payment request 215 may be an exempt payment request configured in accordance with an exempt electronic funds transfer protocol and/or may be configured to facilitate electronic funds transfers via domestic or international electronic funds transfer networks. Further, payment request 215 may be an intrinsically settling payment request, such as a Fedwire electronic funds transfer request. Transfer administrator 210 is configured to recognize and accommodate the particular funds transfer protocol of payment request 215 (e.g., SWIFT, Fedwire).

Relationship information may be acquired from one or more database 211 and, as discussed briefly above, may include an algorithm for determining fees to be assessed in connection with the electronic transfer of funds. Relationship information may be any information necessary or useful in determining associated fees and/or rewards and in identifying appropriate intermediary institutions 240, accounts, and/or transfer protocols. As described above, database 211 may comprise one or more databases such as an ABA routing number database, a database of relationship information, and a database of intermediary institutions and their acceptable, desirable and/or required transfer protocols.

The databases 211 discussed herein may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. The database 211 may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database 211 according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

In an exemplary embodiment, translated payment order is configured in accordance with an electronic funds transfer protocol accepted, preferred, and/or required by transferee institution 260 and/or desired by transferor institution 230. Accordingly, translated payment order may be a participating payment order configured in accordance with a participating electronic funds transfer protocol and may be based at least in part on the incoming payment request 215. It should be noted that translated payment order is configured to facilitate an electronic funds transfer among the intermediary institution 240 and transferee institution 260 and/or to facilitate processing one or more balancing payment, or one or more global accounting entries, among the accounts of transferor institution 230, transferee institution 260, and/or the one or more intermediary institutions 240. Accordingly, translated payment order may cause debiting of an account that represents the proceeds from the incoming funds transfer request 215, e.g., the transferred payment, and facilitating the crediting of an account for the benefit of transferee institution 260.

It should be noted that intermediary institution 240 may comprise transferor institution 230, transferee institution 260, and/or one or more affiliated correspondent institutions. Further, any or all of the accounts necessary to accomplish an exemplary transfer may be maintained by transferor institution 230, transferee institution 260, and/or any of the one or more intermediary institutions 240. In an exemplary embodiment, a temporary transfer demand account may be established to represent the funds of the incoming transfer. The funds may then be maintained in transfer demand account until such time as the associated fees and/or rewards have been determined and the appropriate intermediary institutions 240, accounts, and/or transfer protocols have been identified to accomplish the transfer.

In an exemplary embodiment, transfer administrator 210 may be configured to facilitate processing a balancing payment, or one or more accounting entry, among one or more account of transferor institution's 230 and one or more account of affiliated institution 250. Accordingly, transfer administrator 210 may be configured to facilitate applying a debit to a transfer account of transferor institution 230, e.g., Fedwire account, and applying a credit to the corresponding transfer account of affiliated institution 250. In an exemplary embodiment, transferor institution 230 may own a transfer demand account and a fees payable escrow account both of which may be credited and/or periodically reconciled by transfer administrator 210 so that net fees and/or reimbursements may be received by transferor institution 230. In an exemplary embodiment transferee institution 260 owns an account, capable of being credited by transfer administrator 210, with intermediary institution 240, e.g., the CHIPS or Fedwire account of transferee institution 260.

In another exemplary embodiment, transfer administrator 210 may be configured to facilitate debiting an account of affiliated institution 250 held by intermediary institution 240 as well as crediting an account of intermediary institution 240 held by affiliated institution 250. In yet another exemplary embodiment, transfer administrator 210 may be configured to facilitate debiting an account of intermediary institution 240 held by affiliated institution 250, and crediting an account of transferor institution 230. In an exemplary embodiment, transfer administrator 210 may be configured to facilitate debiting a transfer demand account of transferor institution 230, crediting the outgoing payments queue of intermediary institution 240, and crediting the fees payable escrow account of transferor institution 230. In yet another exemplary embodiment, transfer administrator 210 may be configured to facilitate debiting the scheduled outgoing payments queue of intermediary institution 240 and crediting the account of transferee institution 260 held by intermediary institution 240, e.g., the CHIPS or Fedwire account of transferee institution 260. Finally, transfer administrator 210 may be configured to facilitate reconciling the fees payable escrow account of transferor institution 230 and calculating and paying net fees and/or reimbursements to transferor institution 230.

Transferor institution 230 may also maintain and make available relationship information that includes formulas for fees to be deducted from the transfer and other related information to be matched with a particular payment. This relationship information may include, for example, one or more algorithms for determining fees to be assessed in connection with the electronic transfer of funds.

In addition to other desirable benefits, the instant invention provides transferor institution 230, through intermediary institution 240, with enhanced access to international payment processing networks. Such access enables transferor institution 230 to avoid or minimize the need to invest in a participating (e.g., SWIFT) connection, thereby reducing startup costs as well as recurring fees (e.g., subscription fees).

In an exemplary embodiment, intermediary institution 240 may be equipped with, and/or shares, the same or similar software/hardware payments platform (e.g., an intranet) as affiliated institution 250 so that intermediary institution 240 may process the incoming transfer payments of affiliated institution 250 for the related payments of intermediary institution 240.

In an exemplary embodiment, intermediary institution 240 utilizes an intranet and middleware package, such as IISI, that enables intermediary institution 240 to communicate among the intranet and middleware (e.g., Merva) of intermediary institution 240, allowing intermediary institution 240 to receive SWIFT communications, to read incoming exempt payments that are coded and/or formatted by transferor institution 230 as hybrid instructions for accomplishing exempt payments.

In accordance an exemplary embodiment, intermediary institution 240 may be configured to receive and process participating payment order 225 in substantially the same manner as transfers received from outside intermediary institution 240 on the standard participating network, e.g., the SWIFT network.

As used herein, the terms "end user," "consumer," "customer," "cardmember," "business," "institution," "bank,"

"client," "party," and "merchant" may be used interchangeably with each other, and each shall mean any person, entity, machine, hardware, software and/or business. Although labeled as a "institution," the institution may represent other types of financial and/or card issuing institutions, such as banks, credit card companies, card sponsoring companies, depository institutions, money transmitters, financial data processors, or third party issuers under contract with financial institutions. It is further noted that other participants may be involved in some phases of the transaction, such as an intermediary settlement institution, but these participants are not shown.

Each participant may be equipped with a computing system to facilitate online commerce transactions. Each institution has a computing unit in the form of a personal computer, although other types of computing units may be used including laptops, notebooks, hand held computers, set-top boxes, and the like. The merchant has a computing unit implemented in the form of a computer-server, although other implementations are possible. The institution has a computing center shown as a main frame computer. However, the institution computing center may be implemented in other forms, such as a mini-computer, a PC server, a network set of computers, and the like.

Certain transactions may necessitate communication among the various financial institutions. The computers of the various financial institutions may be interconnected via a second network, referred to as a transfer network. The transfer network represents existing proprietary networks that presently accommodate electronic funds transfers and other transactions for credit cards, debit cards, and other types of financial/banking cards. The transfer network may be a closed network that is assumed to be secure from eavesdroppers. Examples of the electronic transfer system may be implemented at the various financial institutions. In an exemplary implementation, the transfer network may be implemented as computer software modules loaded onto each computer and/or computing center of one or more of the financial institutions so that the computers of the other financial institutions do not require any additional software to participate in the transfers supported by the online transfer system.

In an exemplary embodiment, the method of the invention comprises receiving an incoming payment request 215 in accordance with a first protocol, generating a translated payment order in accordance with a second protocol and based at least in part on the incoming payment request 215, and facilitating communication of the translated payment order to transferee institution 260, whereby funds are electronically transferred from transferor institution 230 to transferee institution 260.

Figure 3:
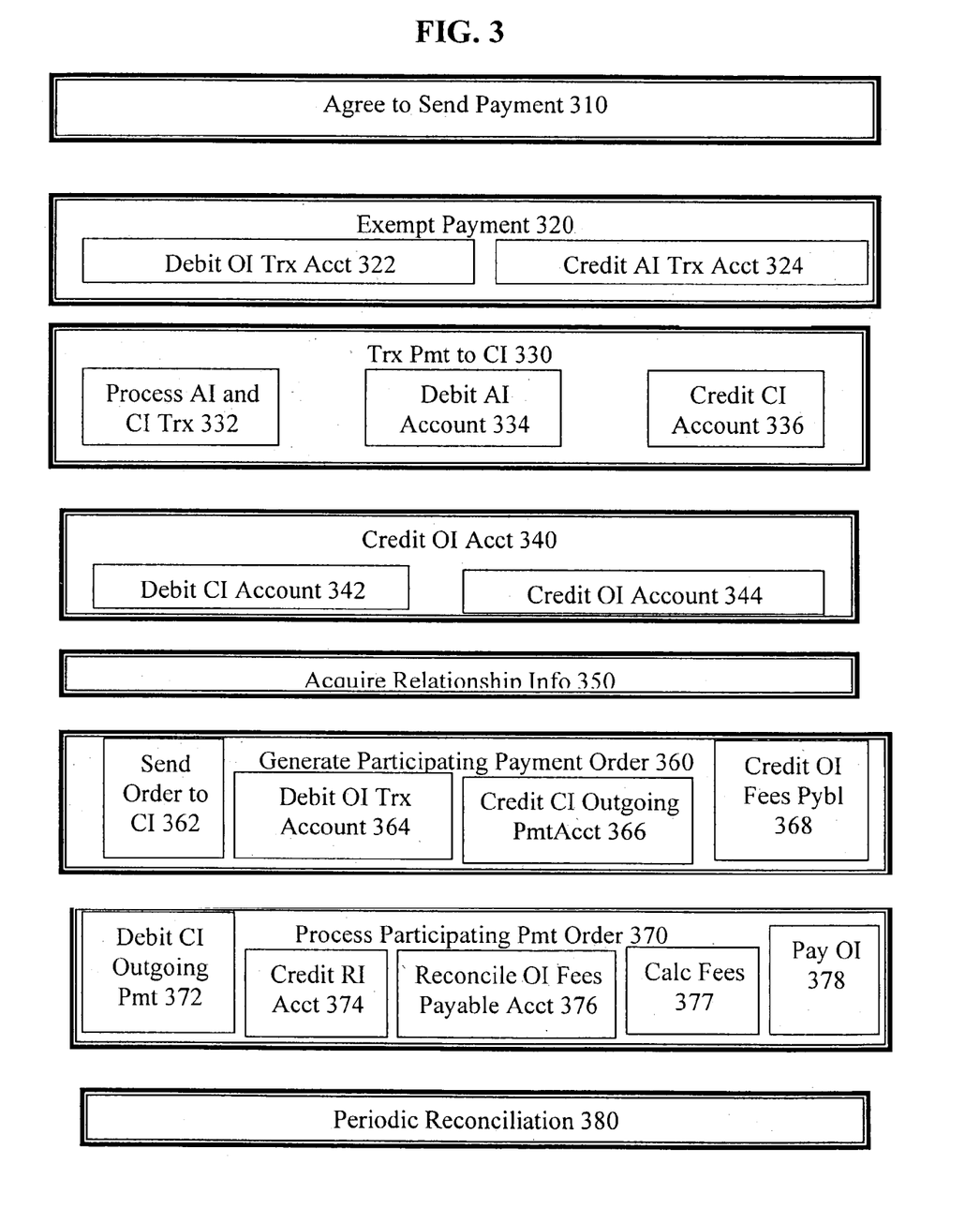
FIG. 3 illustrates an exemplary process for facilitating an electronic finds transfer in accordance with the present invention.

FIG. 3 illustrates an exemplary process for facilitating an electronic funds transfer in accordance with the present invention. With reference to FIG. 3, transferor institution 230 receives a payment request 205 from transferor 101 and agrees to comply with the request 205 by sending a payment to transferee institution 260, either directly or through one or more intermediary institution 240 (step 310). Transferor institution 230 sends a corresponding payment request 215 in compliance with a required or preferred electronic funds transfer protocol, e.g., Fedwire or another electronic funds transfer protocol, to be received by transfer administrator 210, either directly or through one or more intermediary institution 240 (step 320). As described herein, the payment request 215 may be coded and/or formatted as per the preferences or requirements of the intermediary institution 240, i.e., hybrid instructions. It should be noted that intermediary institution 240 may further comprise one or more additional affiliated institution.

In an exemplary embodiment, transfer administrator 210 receives an incoming payment request 215 and establishes and credits a transfer demand account on behalf of transferor institution 230 so as to balance the received funds, i.e., any credit applied to the account of the intermediary institution 240. In an exemplary embodiment, in response to the payment request 215, transfer administrator 210 facilitates applying a debit to a transfer account of transferor institution 230, e.g., Fedwire Account (step 322), and applying a credit to the corresponding transfer account of intermediary institution 240 (step 324).

In an exemplary embodiment, transfer administrator 210 acquires relationship information, which may include accessing and/or executing an algorithm for determining fees to be assessed in connection with the electronic transfer of funds. Based on the acquired relationship information, transfer administrator 210 determines associated fees and/or rewards and identifies appropriate intermediary institutions 240, accounts, and/or transfer protocols. In an exemplary embodiment, transfer administrator 210 accomplishes this step by accessing one or more databases 211 described above.

Based on the incoming payment request 215 and the acquired relationship information, transfer administrator 210 generates a translated payment order by translating the payment request 215, e.g., from an exempt electronic funds transfer protocol to a participating electronic funds transfer protocol. Accordingly, in an exemplary transfer, transfer administrator 210 may generate a translated payment order, such as a participating payment order, by translating an incoming payment request 215, such as an exempt payment request, from the electronic funds transfer protocol of the incoming payment request 215, e.g., an exempt electronic funds transfer protocol, to a translated electronic funds transfer protocol, e.g., a participating electronic funds transfer protocol. Accordingly, in an exemplary transfer, transfer administrator 210 converts all or a portion of an exempt payment to a participating payment, e.g., by converting an exempt Fedwire payment request to a participating SWIFT message.

Once a translated payment order has been generated, transfer administrator 210 may issue the translated payment order so as to accomplish the requested electronic funds transfer among transferor institution 230 to transferee institution 260. In accordance with an exemplary embodiment, the translated payment order may also cause the processing of one or more balancing payment, or one or more global accounting entries, among the accounts of transferor institution 230, transferee institution 260, and/or the one or more intermediary institutions 240 in accordance with the incoming payment request 215. Exemplary balancing payments may include debiting a transfer demand account or another account that represents the proceeds from the incoming funds transfer payment request 215, e.g., the transferred payment, and facilitating the crediting of an account for the benefit of transferee institution 260, crediting an outgoing payment queue of the intermediary institution 240, and crediting an escrow account of transferor institution 230 in accordance with the acquired relationship information.

For example, where the incoming payment request 215 is a Fedwire transfer order, it is understood that a corresponding credit will have been applied to the account of the intermediary institution 240 at its affiliated Federal Reserve institution. Accordingly, the intermediary institution 240 is required to apply a corresponding credit to an account maintained by the intermediary institution 240 to balance the credit applied at the Federal Reserve institution. Then, the intermediary institution 240 may credit an account maintained by it, or one or more of its affiliated institutions, on behalf of transferee institution 260 to fund the translated payment order 225 it issues. This step may also include crediting an escrow account of transferor institution 230 in accordance with the acquired relationship information.

Where intermediary institution 240 comprises one or more affiliated institution, the affiliated institution transfers the payment to intermediary institution 240 (step 330). In one exemplary embodiment, affiliated institution and intermediary institution 240 share the same or similar software/hardware payments platform (e.g., an intranet), and intermediary institution 240 processes the incoming transfer payments of affiliated institution for the related payments of intermediary institution 240 (step 332). For example, an exemplary transfer administrator 210 facilitates debiting an account of affiliated institution with intermediary institution 240 (step 334) as well as crediting an account of intermediary institution 240 held by affiliated institution (step 336).

In an exemplary embodiment, issuing the translated payment order may comprise sending the translated payment order to be received by the intermediary institution 240 to facilitate its automated processing through the established transfer infrastructure of the intermediary institution 240. In an exemplary embodiment, intermediary institution 240 utilizes an intranet and middleware package, such as IISI, that enables intermediary institution 240 to communicate among the intranet and the middleware (e.g., Merva) of intermediary institution 240, allowing intermediary institution 240 to receive SWIFT communications and to read incoming exempt payments that are coded and/or formatted by transferor institution 230 as hybrid instructions for accomplishing exempt payments. In accordance with an exemplary embodiment, such payments are credited to an account established for transferor institution 230 by intermediary institution 240 (step 340). In accordance with this embodiment, transfer administrator 210 facilitates debiting an account of intermediary institution 240 held by affiliated institution (step 342), and crediting the demand account of transferor institution 230 (step 344).

In accordance with an exemplary embodiment, transfer administrator 210 acquires data regarding the formula, associated with transferor institution 230, for fees to be deducted from the transfer and other related information (i.e., relationship information) based on a match of the payment to a data file containing the relationship information of transferor institution 230 (step 350). This relationship information may include, for example, one or more algorithms for determining fees to be assessed in connection with the electronic transfer of funds. Based on the relationship information, transfer administrator 210 may generate translated payment order, less appropriate fees, based at least in part on the payment request 215, yet conforming with a desired or required electronic funds transfer protocol, such as the SWIFT protocol or another participating electronic funds transfer protocol (step 360). Transfer administrator 210 may then send translated payment order 225 to transferee institution 260, either directly or through intermediary institution 240 (step 362). In an exemplary embodiment, transfer administrator 210 may facilitate debiting a transfer demand account of transferor institution 230 (step 364), crediting the outgoing payments account of intermediary institution 240 (step 366), and crediting the fees payable escrow account of transferor institution 230 (step 368).

In accordance with an exemplary embodiment, intermediary institution 240 processes translated payment orders that were generated in the ordinary course, in substantially the same manner as transfers received from outside intermediary institution 240 on a standard participating network, e.g., using existing infrastructure such as a SWIFT network (step 370). In an exemplary embodiment, transfer administrator 210 facilitates debiting the scheduled outgoing payments of intermediary institution 240 (step 372) and crediting an account of transferee institution 260 held by intermediary institution 240, e.g., the CHIPS or Fedwire account of transferee institution 260 (step 374). Finally, on a periodic basis, e.g., monthly, a fees payable escrow account of transferor institution 230 may be reconciled (step 376) and net fees and/or reimbursements calculated (step 377) and paid to transferor institution 230 (step 378).

As a result, the present invention provides many benefits over the prior art including increasing the number of parties that may offer a full range of payment products, rewards, and other incentives. Moreover, transferor institution 230 gains full access to the domestic international payments processing network of an intermediary institution 240. This obviates the need to invest in a participating, e.g., SWIFT, connection, thereby reducing startup costs as well as recurring, e.g., subscription, fees. In addition, the present invention eliminates or dramatically reduces the need to train staff to operate a participating system such as SWIFT. Moreover, the present invention facilitates automated processing; access to the investigations/inquiry network/capabilities of intermediary institution 240, e.g., the abilities to track payments, check status, make inquiries, help resolve errors/disputes; and access to the participating programs of intermediary institution 240.

In addition, the present invention enables intermediary institution 240 to charge a fee from proceeds to any transferee institution 260 who is not a client of transferor institution 230, reducing or eliminating the need of transferor institution 230 to charge part or all of the fee from transferor institution 230. Moreover, based on transfer volume, frequency, or any other relevant criteria, intermediary institution 240 may rebate back to transferor institution 230 a portion of the participating rewards collected by intermediary institution 240 based on the transfers sent to the intermediary institution 240 from transferor institution 230. In an exemplary embodiment, the system further provides for periodic reconciliation of transfer account activity by each intermediary institution 240 (step 380). Finally, the system enables continued use of established transfer systems such as Fedwire, obviating the need for widespread re-tooling to a participating protocol such as SWIFT and the corresponding loss of settlement capabilities provided by Fedwire, thereby also eliminating the need of transferor institution 230 to perform the additional step of covering, i.e., paying or settling, its payment orders.

In accordance with an exemplary embodiment, a specification of transferor institution 230 may be developed to serve as a key identifier to be used for routing incoming payments. This specification may comprise an ABA routing number and/or a distinctive name or any other unique institution identifier. In addition, a demand account in the name of the U.S. institution may be established containing algorithm for determining pricing to be applied to payments.

An "account number," or any other "identifier," as used herein, includes any device, code, or other identifier/indicia suitably configured to allow the consumer to interact or communicate with the system, such as, for example, authorization/access code, personal identification number (PIN), Internet code, other identification code, and/or the like which may be optionally located on a rewards card, charge card, credit card, debit card, prepaid card, telephone card, smart card, magnetic stripe card, bar code card, radio frequency card and/or the like. The account number may be distributed and stored in any form of plastic, electronic, magnetic, radio frequency, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing institution, card type and etc. In this example, the last sixteenth digit may be used as a sum check for the sixteen-digit number. The intermediary eight-to-ten digits are used to uniquely identify the customer.

As transfer payment requests 215 are received by transfer administrator 210, a party's specification, e.g., of transferor institution 230, may be routed to a queue on the intranet. Once in the queue, a payment may be processed as an incoming credit from the transfer protocol followed by a footprint into the ABA queue followed by a review by staff for repairs and/or turning on fee indicators in the intranet, and insertion of a unique identifier to post the entry in the name of transferor institution 230. Fees are collected, and an automatic outgoing SWIFT instruction, appropriately addressed, e.g., to AEIBUS33, may be generated containing full details of the payment, e,g, either MT 100 on Customer Transfer or MT 202 on Institution to Institution transfer. Finally, intermediary institution 240 may receive and process this message as normal SWIFT traffic. In accordance with an exemplary embodiment, cut-off times are established for limiting receipt of exempt transfer payment requests 215 to ensure that no payments are trapped in intranet beyond processing cutoff times with Fedwire and CHIPS.

In one embodiment, only Fedwire credits are processed by the system. In accordance with this embodiment, the system verifies that only the incoming Fedwire transfers are routed. If entries are posted erroneously to an account, in one embodiment, the erroneously credited account should have zero balance at day's end with met cut-off times. In accordance with an exemplary embodiment, intermediary institution 240 may provide customer service on transfer-related investigations. Audit records of the payment may contain information of the original incoming Fedwire in the payment history. If rebates or incentives are part of the marketing plan, transfer administrator 210 may capture and retain information regarding volumes and fees taken. The volume of incoming Fedwire international payments by transferor institution 230 may be periodically linked to an automatic rebate.

Finally, the system may be configured to provide full audit trail details of the payment flow of transfers completed by the system. In one embodiment, statements of account may be sent by fax, and access to intermediary institution 240 may also be available. The system may also be configured to support and recognize specific participating transfer protocols and to determine and use an appropriate algorithm, e.g., benededuct. The system may also include a program to download the queue data to a MS Access database and create a report of the transactions where the fees have to be changed.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference.

It will be appreciated, that many applications of the present invention could be formulated. One skilled in the art will appreciate that the network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings among the various elements. It should be noted that many alternative or additional functional relationships or physical connections may be present in a practical electronic transaction system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention. For example, the steps recited in any of the method or process descriptions may be executed in any order and are not limited to the order presented.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. A data processing system for facilitating electronic transfer of funds, said data processing system comprising:
    a processor for processing digital data;
    a memory coupled to said processor for storing digital data;
    means, coupled to said memory, for inputting digital data; and
    a transfer administrator configured as an application program, said application program stored in said memory and accessible by said processor for directing processing of digital data by said processor;
    said transfer administrator configured to perform the steps of:
        receiving an incoming exempt payment request designating a transferor institution, a quantity of funds to be transferred, and a transferee institution, wherein said payment request includes a first transfer protocol;
        generating a translated and participating payment order by translating said first transfer protocol to a second transfer protocol, wherein said translated and participating payment order is based at least in part on said incoming exempt payment request, and wherein said translated and participating payment order includes said second transfer protocol; and
        facilitating communication of said translated and participating payment order to said transferee institution, whereby funds are electronically transferred from said transferor institution to said transferee institution.

2. The system of claim 1, wherein said incoming exempt payment request is configured in accordance with a Fedwire funds transfer protocol.

3. The system of claim 1, wherein said translated and participating payment order is configured in accordance with a SWIFT messaging system.

4. The system of claim 1, wherein said incoming payment request is received directly from said transferor institution.

5. The system of claim 1, wherein said incoming payment request is received from an intermediary institution.

6. The system of claim 1, wherein said transferor institution is in a first nation and wherein said transferee institution is in a second nation distinct from said first nation.

7. The system of claim 1, wherein said transfer administrator is further configured to perform said step of acquiring relationship information.

8. The system of claim 7, wherein said relationship information comprises an algorithm for determining fees to be assessed in connection with said electronically transferred funds.

9. The system of claim 1, wherein said transfer administrator is further configured to perform said step of initiating payment among an affiliated institution and an intermediary institution in accordance with said incoming exempt payment request and an exempt electronic funds transfer protocol.

10. The system of claim 9, wherein said transfer administrator is further configured to perform said step of facilitating processing of a balancing payment among an account of said transferor institution and an account of said intermediary institution.

11. The system of claim 9, wherein said transfer administrator is further configured to perform said step of debiting an outgoing payment queue of said intermediary institution and crediting an account of said transferee institution.

12. The system of claim 10, wherein said transfer administrator is further configured to perform said step of facilitating processing by debiting said account of said intermediary institution and crediting said account of said transferor institution, said account of said transferor institution configured to accommodate electronic transfer of funds in accordance with a participating electronic funds transfer protocol.

13. The system of claim 9, wherein said transfer administrator is further configured to perform said step of debiting a participating demand account of said transferor institution, crediting an outgoing payment queue of an intermediary institution, and crediting a demand account of said transferor institution in accordance with said relationship information, said demand account configured to accommodate electronic transfer of funds in accordance with a participating electronic funds transfer protocol.

14. A system for facilitating electronic transfer of funds, said system comprising:
a transfer administrator in communication with a transferor institution, an intermediary institution, and a transferee institution;
said transferor institution having an account at said intermediary institution;
said transfer administrator configured to perform the steps of:
receiving an incoming exempt payment request designating said transferor institution, a quantity of funds to be transferred, and said transferee institution, wherein said incoming exempt payment request includes a first transfer protocol;
generating a translated and participating payment order by translating said first transfer protocol to a second transfer protocol, wherein said translated and participating payment order is based at least in part on said incoming exempt payment request, and wherein said translated and participating payment order includes said second transfer protocol; and
facilitating communication of said translated and participating payment order to said transferee institution, whereby finds are electronically transferred from said transferor institution to said transferee institution.

15. A method for facilitating electronic transfer of funds comprising:
receiving an incoming exempt payment request designating a transferor institution, a quantity of funds to be transferred, and a transferee institution, wherein said payment request includes a first transfer protocol;
generating a translated and participating payment order by translating said first transfer protocol to a second transfer protocol, wherein said translated and participating payment order is based at least in part on said incoming exempt payment request, and wherein said translated and participating payment order includes said second transfer protocol; and
facilitating communication of said translated and participating payment order to said transferee institution, whereby funds are electronically transferred from said transferor institution to said transferee institution.

16. The method of claim 15, wherein at least one of said steps of receiving said incoming exempt payment request includes receiving said incoming exempt payment request configured in accordance with a Fedwire funds transfer protocol and said generating said translated and participating payment order includes generating said translated and participating payment order configured in accordance with a SWIFT messaging system.

17. The method of claim 15, further comprising converting a currency of said payment request.

18. The method of claim 15, further comprising providing a rebate to at least one of said transferor institution and said transferee institution.

19. The method of claim 15, wherein said step of generating said translated and participating payment order comprises generating said translated payment order at an intermediary institution to facilitate payment to said transferee institution.

20. The method of claim 15, wherein said step of generating said translated and participating payment order comprises generating said translated payment order at an intermediary institution to facilitate payment to said transferee institution using at least one of a Fedwire, SWIFT and CHIPS transfer protocol.

* * * * *